UNITED STATES PATENT OFFICE.

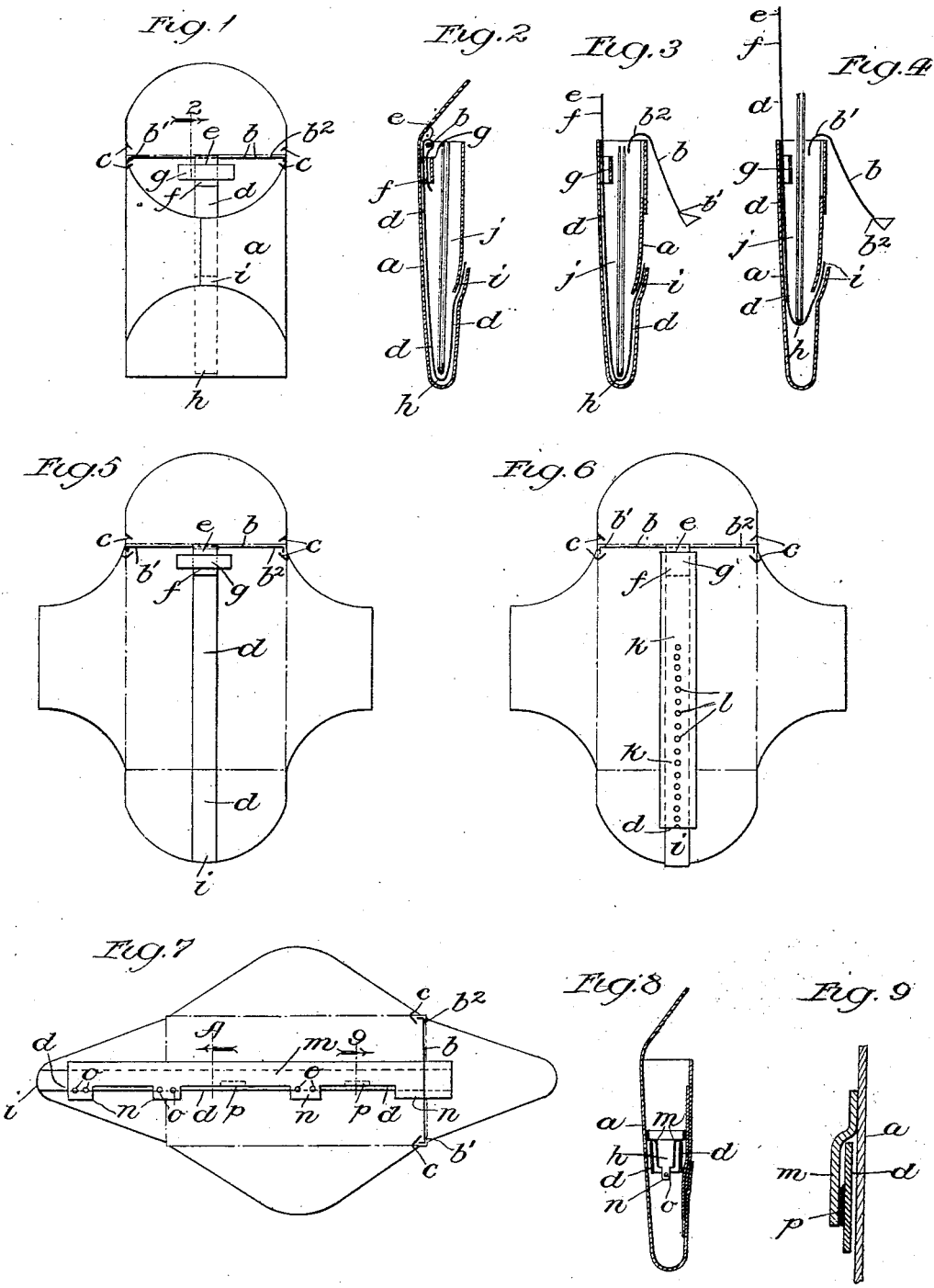

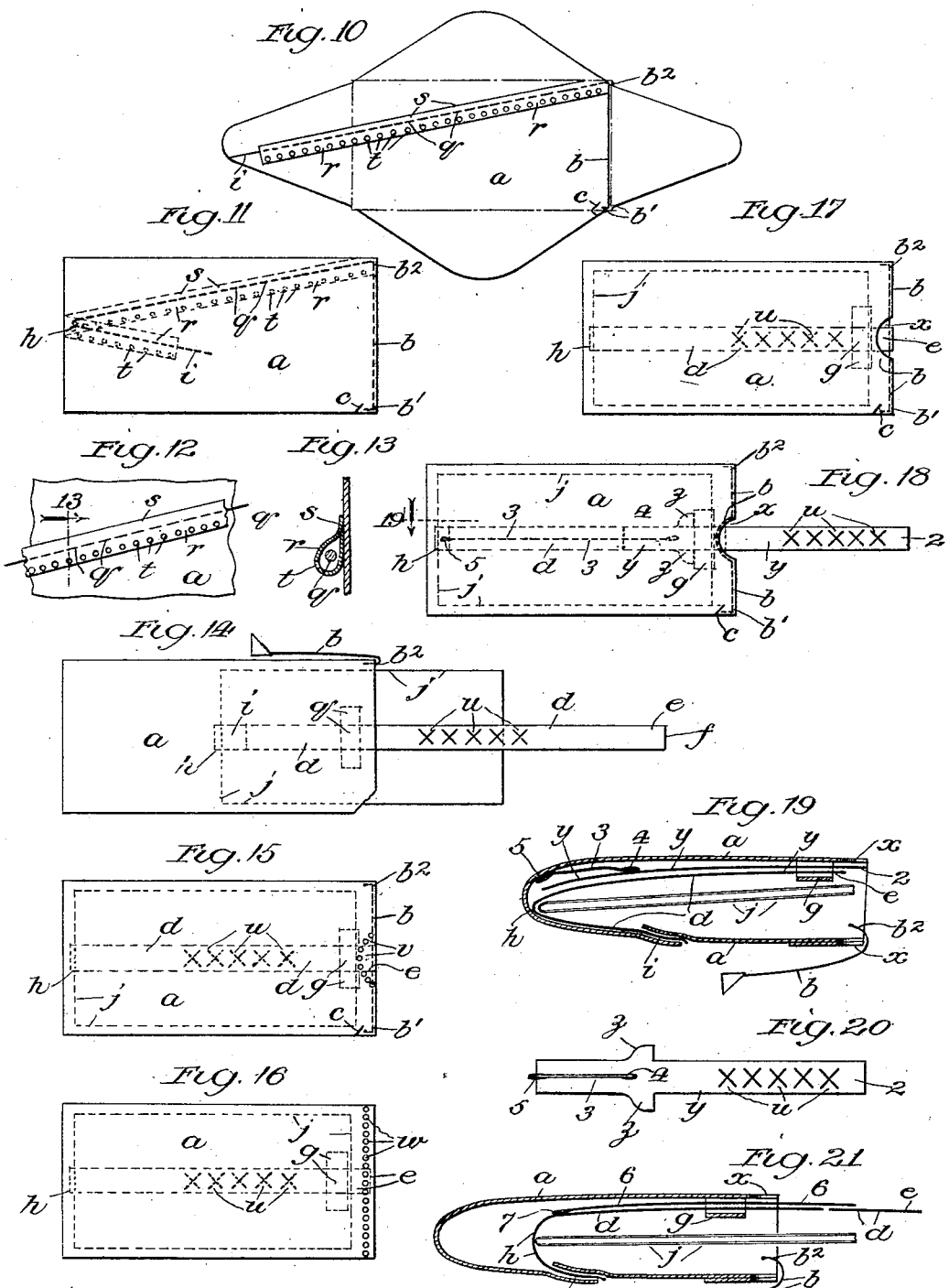

ORRIN B. PECK AND WILBUR H. PECK, OF CHICAGO, ILLINOIS; SAID ORRIN B. PECK ASSIGNOR TO SAID WILBUR H. PECK.

LETTER OR SIMILAR ENVELOP OR COVERING.

SPECIFICATION forming part of Letters Patent No. 710,710, dated October 7, 1902.

Application filed April 21, 1902. Serial No. 103,993. (No model.)

*To all whom it may concern:*

Be it known that we, ORRIN B. PECK and WILBUR H. PECK, citizens of the United States, residing at Chicago, in the county of Cook and State of Illinois, have invented certain new and useful Improvements in Letter or Similar Envelops or Coverings, of which the following is a specification.

Our invention relates to improvements in letter or similar envelops and coverings; and its objects are directed to means, parts, combinations, features, and details hereinafter described and claimed.

In the drawings, Figure 1 is a plan view of the back side of an envelop having its open or sealing flap or wing located at the end, the same being shown extended, exposing portions of our invention in full lines, other portions being shown within the envelop in dotted lines. Fig. 2 is a longitudinal cross-section of Fig. 1 on line 2 looking in the direction of the arrow, with some of the parts shown somewhat removed from each other to enable better distinction and with the sealing-wing in position somewhat less extended. Fig. 3 is similar to Fig. 2, but showing the latter after it has been sealed and then opened by the cutter or opener. Fig. 4 is similar to Fig. 3, but showing the extractor as having been partly operated and the contents consequently moved to a position of partial extraction. Fig. 5 is a plan of paper cut to shape like that used in forming the envelop shown in Fig. 1, exposing the side that forms the inner walls of the envelop, with the parts of our invention, such as is used in Fig. 1, in place on it. Fig. 6 is similar to Fig. 5, but modified in some particulars. Fig. 7 is similar to Fig. 6 modified. Fig. 8 is a cross-section of an envelop completed but unsealed, as it would appear on line A, Fig. 7, with our invention modified as mounted in Fig. 7 and showing some parts of the envelop somewhat moved apart to enable better distinction. Fig. 9 is a cross-section of a portion or detail of Fig. 7 on line 9 looking in the direction of the arrow, enlarged to more clearly show certain features. Fig. 10 is a view of an envelop-paper similar to Fig. 7, but showing our invention modified. Fig. 11 is the front plan of an envelop made of paper like that shown in Fig. 10 with our invention as embodied or used in that figure. Fig. 12 is a detail of a portion of envelop enlarged, showing more clearly certain features of our invention as embodied in Figs. 10 and 11. Fig. 13 is a cross-section of a portion of Fig. 12 on line 13 looking in the direction of the arrow. Fig. 14 is a plan of the front or face side of an envelop similar to Figs. 1, 2, 3, and 4, showing the envelop after it has been sealed and then opened with its cutter or opener and with the contents moved well out by the operation or drawing of the extractor and showing the lettering or inscription on the extractor drawn to exposure out of the envelop, and further showing the maintaining and guiding portion or means for the extractor in dotted lines. Fig. 15 is a plan view of the front or face side of an envelop similar to Fig. 14 somewhat modified and unopened. Fig. 16 is similar to Fig. 15 modified. Fig. 17 is similar to Fig. 14 modified and with the envelop shown unopened. Fig. 18 is similar to Fig. 17, with some additional or modified parts and features. Fig. 19 is a longitudinal cross-section of Fig. 18 on line 19 looking in the direction of the arrow modified and having been opened by its cutter and also shown distended to enable better distinction. Fig. 20 is a detail of a portion of our invention shown in Figs. 18 and 19. Fig. 21 is similar to Fig. 19, but with the extractor in position of having been operated and the contents of the envelop moved to a desired position of partial extraction and modified by having separate but attached means for carrying lettering or inscriptions.

Fig. 1 of the drawings, as above stated, represents the back side of an envelop $a$ of quite an ordinary general form, with its open flap or unsealed wing located at the end and in an entirely open or flatly-extended position. Located within the envelop and exposed in part to view in this figure by the open or extended wing are parts of our invention. A cutter, opener, abrader, or opening means $b$, made of thread, fiber, or any other suitable material, best, however, of a compact slender flexible nature, as a thread or small wire, is located, preferably, across within the envelop close to its end wall or fold and is secured sufficiently well at each of its end portions to insure its performing the duties for which it is intended.

We prefer to have the end or end portions of the cutter or opening means, which we will term the "initial" end or portion $b'$ and the "terminal" end or portion $b^2$, respectively, properly located within or near corners of the envelop, and prefer that one or both of such corners be a weakened portion of the envelop, so when it is desired to open the envelop one of these weakened portions or corners may be easily torn off, thus serving not only as a means for easily making the initial opening or rupture in the envelop, but also as a handle or grasping means of the cutter, the initial end or portion of the latter having been sufficiently secured thereto by paste, glue, or by other proper means. This weakening of the corner or portion of the envelop may be accomplished by proper small cuts or punctures $c$ in the envelop or in any suitable desired way. We also prefer to provide an extractor or extracting means $d$ within the envelop to move its contents to a position of at least partial extraction for convenient grasp. This extractor or extracting means, which, as is illustrated in Fig. 1 and most other figures of the drawings, is preferably a separate piece from the cutter and best formed of a flat or at least a substantially flat piece of flexible material, as ribbon, suitable tape, or strips of paper, best having a greater transverse area than the cutter or opener, is preferably placed so that its initial operating or grasping end or portion will be within the envelop in position to be drawn out, exposed, or closely at hand and accessible through the opened or severed part or end of the envelop when the same is opened by the cutter or otherwise along the intended opening-line. This position of the initial end or portion is most conveniently close within a folded border of the envelop, and in instances where in the manufacture or completion of the envelops a proper comparatively small portion of the wall or border is cut or removed, so as to leave an open space for this purpose, it is preferred to also have the initial end or portion of the extractor located to exposure through such opening, which serves as a means of making the extractor's presence known before the envelop is opened. We have shown the envelop in Figs. 17 and 18 and some other figures of the drawings with a small part cut away at $x$, leaving an open portion, and of course such cutting or opening may be applied to Fig. 1 and similar figures, if desired.

The initial portion $e$ of the extractor we prefer to attach or connect to a desired (preferably central) portion of the cutter or to otherwise temporarily engage them, yet, however, to have them of at least substantially separate portions for the purposes hereinafter stated. To best accomplish this connection or engagement, we prefer to fold, loop, or yoke the initial portion around the cutter, as plainly shown in Figs. 1 and 2, and lay or pass a desired small part of its end $f$ back in a yieldable manner under a maintaining and guiding strip, means, or piece $g$, which also serves as a protecting and shielding means for that portion of the extractor. We have shown this maintaining or guiding strip, means, or piece in most of the figures of the drawings as a small strip of paper or similar suitable material pasted or otherwise properly secured to the walls of the envelop at each side of the extractor, as is illustrated, and passing over the latter in a comparatively loose or unattached way, as well as over the folded end portion $f$, in a manner so it will hold the end portion in place or assist in doing so and out of obstruction to the introduction of contents of the envelop and at the same time permit this end to be easily drawn or straightened out through the severed end of the envelop by the cutter as the latter is performing its opening function or otherwise, if so desired. This end portion is shown in a drawn-out position in Fig. 3.

After the envelop has been opened the portion or strip $g$ serves as means for guiding and holding the extractor or extracting means in best position while it is sliding or passing through or under it during operation and thereafter, especially if it is desired to return the contents to the envelop.

By the arrangement of connecting the cutter and extractor, so to speak, as just described, the former assists in holding the latter in place within the envelop until it is desired to open the envelop, and then it serves as means, as above explained, for drawing its initial operating end or portion out to convenient grasp through the newly severed or opened end or portion of the envelop. If, however, it is preferred, the grasping or initial operating end or portion of the extractor need not be connected to the cutter, but may be properly held by the means $g$ closely or in juxtaposition to the portion of the envelop to be opened, so as such opening or severence is made this initial portion or end will be at hand for convenient grasp in or through such opening, or, further, if desired, the initial operating end or portion of the extractor may be located and held or maintained with or without the cutter in position close to or within a weakened or severed portion of the envelop, as will hereinafter be more fully described in connection with some of the last figures of the drawings.

We prefer that the maintaining and guiding strip or means $g$ should be fastened to the inner side of the front wall of the envelop, as illustrated, and hold the initial end portion of the extractor closely up to that wall and that the extractor should from thence traverse closely against or along this wall until the opposite end of the envelop is reached, as specially shown in Figs. 2, 3, and 4, thence turn closely within the end fold of the envelop at this point, cross over to the opposite or back wall, forming a loop or yoke h, and thence course in a reverse direction along the opposite or back wall of the envelop a desired distance, where its terminal or end portion i is sufficiently well secured, preferably between overlapping sealed edges of the wings or flaps of the envelop, as shown in Figs. 2, 3, and 4. By this arrangement it will be seen that the contents j of the envelop, which in Fig. 1 are not shown, but are illustrated in Figs. 2, 3, and 4 and some other figures, will rest within the loop or yoke h, and as the extractor is drawn out, as shown in Figs. 4, 14, and 21, the yoke will be progressively traveled, shifted, or moved toward the opened end or portion of the envelop and will therefore to such extent carry or force the contents of the envelop along to a position of at least partial extraction and in position for convenient grasp. In this procedure by drawing the extractor fully out to the extent designed the loop or yoke is shifted or traveled by the progressive doubling or folding, so to speak, of all the portions of the extractor lying between that portion forming the initial or original loop closely within the folded end of the envelop and the secured terminal end portion of the extractor. If, however, the extractor is only partially operated or drawn out, the loop will be traveled only to a proportionate extent and a relatively large portion of that certain part of the extractor will serve in the formation of the shifting or traveling loop or yoke, and the contents of the envelop will therefore only be moved in extraction accordingly.

In Fig. 5 we have shown the paper cut to form like that used in making the envelop shown in Fig. 1 with the parts of our invention such as are employed in Fig. 1 exposed in plan on its surface.

It is very important, if not absolutely necessary, that the extractor should be sufficiently well held in place within the envelop to not only enable the contents to be inserted into the envelop without obstruction or interference, but also to insure and prevent the extractor from being moved or shifted out of place, so that such contents will with practical certainty enter the loop or yoke in a manner to be moved or forced toward extraction during operation. It is also necessary that the means of holding the extractor to place until required for extracting operation should not only be sufficient for this purpose, but must be of a nature that such of its parts as may be so required will readily yield to moderate tension in operating service, and thus readily permit of such operation.

As combined and more complete means for sufficiently holding the extractor to place as well as for protecting and guiding it and yet permitting it throughout those portions necessary to be readily freed or quickly yield or respond in operating service we have extended the part g along the extractor, and thus provided a shield or covering k, Fig. 6, preferably of light, thin, or frail paper or similar suitable material covered or laid over the larger portion or length of the extractor, and have pasted it to the walls of the envelop along near each edge of the extractor, but not to the extractor, thereby leaving the latter unattached to the covering unless possibly near its terminal end, and the extractor also except at this terminal end or portion unattached to the envelop through its covering.

We prefer that the terminal end portion of the extractor, as shown, should not be covered by the covering k, as uncovered it can be somewhat better and more readily secured to the envelop in folding and completing the latter.

To facilitate the easy release of the extractor from the covering k during extracting service, we provide this covering with a line of perforations l along in position, so after being sealed up into an envelop when the extractor is drawn the covering will readily yield or tear along its weakened line, first commencing within the yoke, thereby releasing it, and then progressively traveling along the weakened line as the yoke is drawn or traveled upward, and to such extent other suitable weakening agencies may be employed instead of the perforations, if desired.

In Fig. 7 we have illustrated a piece of paper in plan cut to shape for forming an envelop somewhat different from those shown in the former figures of the drawings. When folded and pasted, it is designed to have the open or sealing flap or wing of this envelop located at one of its long or side borders, as shown in Fig. 8, instead of at its end. In Figs. 7 and 8 we have shown an extractor and cutter or opener similar to those above described, but with a shield or covering and means for holding the extractor to place modified to better suit this different form of envelop and to afford somewhat less obstruction and resistance to the extractor in its operating service. As stated, the open flap or portion of envelops shown in these figures is to be along one of its side borders, and therefore contents will be introduced transversely to the longitudinal course of the extractor. To protect the extractor from this source and direction of disturbance and to prevent it from being an obstruction, we paste or otherwise secure or form a strip m of preferably light or frail paper or other suitable material, preferably similar to that used in k, Fig. 6, to the envelop along the edge of the extractor nearest to the opened portion of the envelop and allow the paper to lap or extend loosely over this edge of the extractor a desired distance, so material being introduced into the envelop will readily pass or slide to place over the extractor without disturbing it.

To assist in holding the extractor to place and especially well and closely within the ends of the envelop and also to assist in holding the covering shield or strip *m* in place, we prefer to form the strip with extended portions or pieces *n* and carry or extend them clear across transversely over desired portions of the extractor and paste or otherwise secure them to the walls of the envelop at this opposite side of the extractor.

We prefer that extended parts *n* over the extractor should at least be located where one or both end folds of the envelop occur, and, if desired, the cutter may pass over this strip as well as over the extractor at the point where the latter crosses the cutter's course, as shown in Fig. 7. To insure that such of these extended portions *n* as come within the traveling zone of the loop or yoke will yield easily to the tension of the extractor during operation, we provide them with perforations *o*, Fig. 7, or with suitable weakening agencies.

To further assist in holding the extractor to place in an easily-detachable manner, we paste, to a preferably small desired extent, the extractor to the overlapping portion of the covering shield or strip *m*, as indicated at *p*, Fig. 7. Even by very light or frail pasting in this way the extractor will be held well to place under the overlapping shield or protecting-strip *m* and will readily yield to a moderate operating tension sometimes by becoming wholly unpasted at these points, or if such pasting or fastening is more secure by wholly or in part tearing away portions of the light shielding material or paper. In Fig. 8 we have shown the relative positions in this arrangement of the shield and extractor in the envelop after it is pasted up as the same would appear in cross-section on line A of Fig. 7. The parts are somewhat moved apart, however, to enable better distinction.

In Fig. 9 we have shown an enlarged cross-section of a portion of Fig. 7 on line 9, looking in the direction of the arrow. This figure illustrates more clearly a pasted point *p*.

In Fig. 10 we have illustrated a similar plan of envelop paper to Fig. 7, but having an extractor *q*, of a thread, fiber, or similar material, traversing obliquely to the parallel line that will form the borders of the envelope. In this figure the terminal end of the cutter is attached to the extractor, and, in fact, the latter is a continuation of the same piece of material.

Fig. 11 is an envelop made up of paper formed as shown in Fig. 10 and with the parts of our invention mounted therein that are shown in Fig. 10. In these two latter figures, as well as in detail, Figs. 12 and 13, we have shown the means *r*, for holding the extractor to place throughout most its length, formed of light or frail paper or similar material wrapped around or incasing or covering the extractors and having its edge brought together and pasted at *s*, as specially shown in Fig. 13, or otherwise properly secured to the wall of the envelop.

To enable easy tearing of the covering means *r* to release the cutter in operating service, we have also provided this covering or casing with a line of perforations *t*; but of course, if desired, other forms of puncture or weakening means may be employed instead of the perforations *t*, both in this design of a casing, covering, or shield, as well as those shown in Figs. 6 and 7.

If desired, lettering or inscriptions or monograms may be placed or formed on the extractors, so that it will wholly or partially appear to view out of the envelop as the extractors are drawn out in operating service. These letterings, monograms, or inscriptions may either be printed or formed directly on the extractors, or, if desired, through lack of sufficient surface or for other reasons supplemental parts carrying them may be pasted or otherwise properly secured to or on the extractor and moved or traveled thereby. One form of this latter arrangement is illustrated at 6, Fig. 21.

In all of the figures of the drawings previous to Fig. 10 the back sides or edges of the extractors are illustrated, and there is therefore no lettering or inscriptions illustrated on them. It is assumed, however, that they are present on the front side of these parts, as we prefer to have such matter located on the front side of the extractors, being that side when drawn out which corresponds to the front or face side of the envelop. Of course lettering or inscriptions or other desired matter may be placed on the back sides of the extractors or even on both sides of the same.

In Fig. 14 we have illustrated a plan of the front side of an envelop having been opened by its cutter *b*, which after it has performed its opening duty is shown yet attached to the envelop. We have also shown the extractor *d* drawn out, having performed its duty in moving to a desired position in extraction the contents *j* of the envelop as well as having carried the lettering or inscriptions *u* to full view or exposure out of the envelop. These letterings or inscriptions may be of any design or form desired that there is room to mount or form. In this Fig. 14, as in many other figures of the drawings, the maintaining and guiding piece, portion, or means *g* is shown in dotted lines.

In Fig. 15 we have illustrated an envelop with a small portion *v* of its end that it is intended to open weakened by perforations and with the initial operating end or portion of the extractor (indicated in dotted lines) located in such weakened portion and held to place by the guiding and maintaining means *g*, which is also indicated in dotted lines. This weakened portion *v* indicates to the observer where the initial operating end of the extractor is located, and in cases where a cutter, abrader, or opener *b* is not employed serves as a point that may be easily first torn out in opening the envelop, and then affords access for the insertion of a knife or other secondary means for further opening the envelop. In this figure, as in the two succeeding ones, we have indicated the inscriptions or lettering $u$ on the extractor within the envelop in the form X X X X X in dotted lines.

In Fig. 16 we have shown an arrangement similar to that in Fig. 15, but with the cutter or opener $b$ dispensed with, and instead of a comparatively small portion $v$ weakened we have formed a weakening-line $w$ by perforations across the entire end, or practically so, of the envelop, so when it is desired to open the envelop the end portion may be readily torn off along this weakened line and leave the initial operating end portion of the extractor in position of ready access for service and the channel or opening in the envelop ready for extraction of the contents. The means $g$, as in other instances explained, will serve to maintain and guide the extractor.

In Fig. 17 we have shown an arrangement and combination of parts similar to those in Fig. 1, but with the envelop sealed, and clearly illustrating the open portion $x$, which in Fig. 1 is assumed, if desired, and exposing the initial operating portion or end of the extractor exposed to view therein. This arrangement may be used with the cutter $b$ or without it. If used without a cutter, the opening at $x$, as well as showing to view the initial operating end or portion of the extractor, will also serve as convenient ready means for the insertion of a knife or other secondary means for further opening the envelop.

In Figs. 18 and 19 we have shown, in addition to the extractor, other secondary or supplemental independently-operating means $y$ for carrying lettering or inscriptions. This secondary or supplemental means is shown in enlarged detail, Fig. 20, and may be of a proper piece of cardboard, ribbon, celluloid, or any other desired suitable material either similar to or different from the extractor, and may be employed either in combination with the extractor or alone. We prefer with this secondary or supplemental means to employ the guiding and maintaining means $g$ and when desired such other or different protecting and guiding means as may be of advantage. We prefer that this means $y$ should have projecting pieces $z$ (specially shown in Fig. 20) properly located to contact and serve as stops against the piece $g$ to prevent the means $y$ from being drawn out beyond the desired or predetermined degree of projection from the envelop. Instead of the projection $z$, if desired other arrangement of stops or means for limiting the degree or extent of projection of the part $y$ may be employed.

In Fig. 18 we have shown the envelop with a desired section or portion at $x$ removed, as in Fig. 17, and with the part or means $y$ drawn out from the envelop through the said opening at $x$ to the full limit permitted by the stops $z$, the lettering or inscriptions therefore being shown or exposed outside of the envelop.

In the location and arrangement of the independently-operating part or means $y$ we prefer to have its initial or grasping end 2, while the part is in its normal place in the envelop, in position within or slightly extended through the opening at $x$, as specially shown in Fig. 19, which figure is a longitudinal cross-section of Fig. 18 on line 19, looking in the direction of the arrow, but the former figure enlarged, opened, and inflated to show better distinction of parts. When a cutter or opener $b$ is used with an arrangement of the part $y$, and the envelop, with a portion, as at $x$, removed, as is illustrated and described in connection with Fig. 18, we prefer that the cutter should be located with respect to the said opening caused by the removed portion, as is shown in that figure—that is to say, we prefer that the cutter should be deflected or laid around the edge of said opening and not pass across the same, which latter position would be an obstruction to grasping the end of the part $y$ through this opening.

We prefer in some instances to have the part $y$ and the opening at $x$ so proportioned in size and relatively located as to enable the part $y$ to be drawn out to the limited extent through this opening by the thumb and forefinger without further opening the envelop or disturbing other portions of the contents thereof unless it be a desired small connected or operating portion, as is specially shown in Fig. 18. This arrangement is more particularly advantageous and useful as a novelty and an advertising means, or, if desired, instructions of how to open and operate the envelop and its parts may be printed on the part $y$, which would naturally be first drawn to exposure from the envelop. We also prefer to provide means whereby the part $y$ will be automatically pulled, drawn, or returned to place within the envelop from a drawn-out position when released in such position. To accomplish this, we provide an elastic 3, preferably of a suitable small piece of rubber, properly secured to the part $y$, as shown at 4, and to or within the envelop at 5 in relative positions, so when the part $y$ is drawn out the elastic will be extended, as shown by the dotted line 3, Fig. 18, and so upon the cessation of outward tension of the part $y$ the elastic will serve as means for drawing it quickly to its normal or original position within the envelop.

If desired, other substantially similar or any suitable means may be employed instead of the elastic to return the part $y$ to place, or, in fact, manual energy may be relied upon for this purpose; but we prefer to employ the elastic, and thus have the part returned automatically.

When the independently-operating supplemental or secondary part $y$ is used in conjunction with the extractor, they may be laid together, as specially shown in Fig. 19, the former preferably nearest or next to the face, side, or wall of the envelop, as shown, and in such relation as to permit one to be operated without necessarily operating or particularly disturbing the other.

When the extractor and part *y* are both used, the extractor may or may not carry lettering or inscriptions, as desired.

In Fig. 21 the separate piece or portion 6 for carrying the lettering or inscriptions may be of paper or any suitable material and may be attached to the extractor at 7 or otherwise and operated or moved by it. This part may be of appropriate size desired, and in cases where the surface on the extractor is small this arragement is particularly useful.

What we regard as new, and desire to secure by Letters Patent, is—

1. In combination with an envelop or similar covering, a cutter or abrader carried by said envelop in a manner whereby tension may be applied and the envelop thereby opened, and an extractor formed of a separate piece for moving the contents of said envelop to a position of at least partial extraction, the initial end portion of such extractor located in close proximity to the cutter or abrader, the extractor thence extending within the envelop and forming a yoke or loop and having its terminal end secured to the envelop, substantially as described.

2. In combination with an envelop or similar covering, means for opening the same, and means for moving its contents to a position of at least partial extraction therefrom, the two being detachably engaged, substantially as described.

3. In combination with an envelop or similar covering, a cutter or abrader carried by said envelop in a manner whereby tension may be applied and the envelop opened, and means detachably engaged with said cutter or abrader whereby the contents of said envelop may be moved to a position of at least partial extraction from the envelop, substantially as described.

4. In combination with an envelop or similar covering, a cutter or abrader carried by said envelop in a manner whereby tension may be applied and the envelop thereby opened, and means having a loop or yoke within said envelop whereby its contents may be moved to a position of at least partial extraction, and also having a loop or yoke through which the cutter or abrader passes, substantially as described.

5. In combination with an envelop or similar covering, a cutter or abrader carried by said envelop whereby tension may be applied and the envelop opened, and means whereby the contents of said envelops may be moved to a position of at least partial extraction, said means engaged with the cutter in a detachable manner so at least a small part of its initial portion or end becomes exposed and disengaged from the cutter through the opened part of the envelop by the operation of the cutter, substantially as described.

6. In combination with an envelop or similar covering, a cutter or abrader carried by said envelop whereby tension may be applied and the envelop opened, and means whereby the contents of said envelop may be moved to a position of at least partial extraction therefrom, said means passing over or around said cutter or abrader in a manner so a portion of it is drawn to projection from said envelop by the cutter or abrader in its operation and to disengagement with the latter, thereby affording easy grasp for further withdrawal, substantially as described.

7. In combination with an envelop or similar covering, a cutter or abrader carried by said envelop whereby tension may be applied and the envelop opened, and means whereby the contents of said envelop may be moved to a position of at least partial extraction, said means carrying lettering or inscriptions and having its initial end portion detachably engaged to the cutter or abrader, substantially as described.

8. In combination with an envelop or similar covering, a cutter or abrader carried by said envelop, and means whereby tension may be applied and the envelop opened, and means whereby the contents of said envelop may be moved to a position of at least partial extraction, said means having its initial end portion detachably engaged with the cutter or abrader and carrying lettering or inscriptions in a position to at least partly appear to exposure out of the envelop when said extracting means are drawn out in operation, substantially as described.

9. In combination with an envelop or similar covering, a cutter or abrader carried by said envelop whereby tension may be applied and the envelop opened, and means whereby the contents of the envelop may be moved to a position of at least partial extraction, having its initial end or portion detachably engaged with the cutter or abrader and forming within the envelop a yoke or loop, and carrying lettering or inscriptions in a position to at least partially appear to exposure out of the envelop when said extracting means are drawn out in operation and again disappear within the envelop when the contents thereof are properly returned through its open portion, substantially as described.

10. In combination with an envelop or similar covering, a cutter or abrader carried by said envelop whereby tension may be applied and the envelop opened, and means comprising a tape or ribbon whereby the contents of the envelop may be moved to a position of at least partial extraction, said tape or ribbon carrying lettering or inscriptions in a position to at least partly appear to exposure out of the envelop when it is drawn out in extraction duty and having its end portion detachably connected with the cutter or abrader in a manner whereby such portion will be drawn to exposure through the opened part of the envelop during the opening action and disconnected therefrom, substantially as described.

11. In combination with an envelop or similar covering, a cutter comprising a thread or similar portion, and an extractor of at least a substantially separate part comprising a ribbon or similar portion, having at least a substantially flat surface of greater transverse area than the cutter, the two within the envelop in such relation that the operation of the former will bring to access for service the initial operating end portion of the latter, substantially as described.

12. In combination with an envelop or similar covering, a cutter comprising a thread or similar portion, and an extractor of at least a substantially separate part comprising a ribbon or similar portion, having at least a substantially flat surface of greater transverse area than the cutter, the two in such relation as the former in its operation will bring to accessible exposure the initial operating end portion of the latter, substantially as described.

13. In combination with an envelop or similar covering, a cutter comprising a thread or similar portion, and an extractor of at least a substantially separate part comprising a ribbon or similar portion, having at least a substantially flat surface of greater transverse area than the cutter, the two in such relation as the former in its operation will draw the initial operating end portion of the latter out of the opening effected in the envelop, substantially as described.

14. In combination with an envelop or similar covering, means within the envelop for moving the contents thereof to a position of at least partial extraction accessible for manual operation by sufficiently opening the envelop, and means for assisting to hold said moving or extracting means in position within the envelop and in guiding it during operation, substantially as described.

15. In combination with an envelop or similar covering, means within the envelop for moving the contents thereof to a position of at least partial extraction, and means for assisting to hold said moving or extracting means in position within the envelop and in guiding it during operation, and a cutter or opener carried by the envelop traversing a point adjacent to the initial operating portion of the extraction means and adapted through its opening function to expose such initial portion, substantially as described.

16. In combination with an envelop or similar covering, means within the envelop for moving the contents thereof to a position of at least partial extraction, means for assisting in holding said moving or extracting means in position within the envelop and for guiding it during operation, and a cutter or opener located with relation to the extracting means in a manner to draw or project a portion of its end out of the envelop during opening operation, substantially as described.

17. In combination with an envelop or similar covering, means within the envelop for moving the contents thereof to a position of at least partial extraction, means for assisting in holding said moving or extracting means in position within the envelop and for guiding it during operation, and a cutter or opener located with relation to the extracting means in a manner to draw or project a portion of its end out of the envelop during opening operation, said cutter or opener having the initial end portion of the extractor yoked around it, thence said end portion passing under the maintaining and guiding means, substantially as described.

18. In combination with an envelop or similar covering, means within the envelop for moving the contents to a position of at least partial extraction, means for assisting in holding said moving or extracting means in position within the envelop and for guiding it during operation, and a cutter or opener located with relation to the extracting means in a manner to draw or project a portion of its end out of the envelop during opening operation, said cutter or opener having the initial end portion of the extracting means yoked around it, and a maintaining portion for holding the initial folded or yoked end of the extracting means in place until withdrawn by the cutter during opening operation, substantially as described.

19. In combination with an envelop or similar covering, means located therein for moving its contents to a position of at least partial extraction with its initial operating portion adjacent to a folded border of the envelop and accessible to be manually operated only by at least partial opening of the envelop, and means for shielding and guiding said extraction means, substantially as described.

20. In combination with an envelop or similar covering, means located therein for moving its contents to a position of at least partial extraction, means shielding and guiding such extraction means secured to the wall of the envelop along that edge of said extraction means nearest to the opening through which contents is inserted into the envelop and overlapping at least a portion of the extraction means, substantially as described.

21. In combination with an envelop or similar covering, means located therein for moving its contents to a position of at least partial extraction, a shield or covering for such means to shield and hold it to place adapted to yield as desired and thereby release the extractor under operating tension, substantially as described.

22. In combination with an envelop or similar covering, means located therein for moving its contents to a position of at least partial extraction, a shield or covering for such means to shield and hold it to place adapted to yield as desired, thereby releasing the extracting means during operating tension, said shield or covering provided with weakening perforations or agencies on a part of its surface, substantially as described.

23. In combination with an envelop or similar covering, means located therein for moving its contents to a position of at least partial extraction, a shield or covering for such means to shield and hold it to place adapted to yield as desired and thereby release the extracting means during operating tension, said shield or covering provided with weakening perforations or agencies on a desired part of its surface, and a cutter or opener carried by said envelop, substantially as described.

24. In combination with an envelop or similar covering, means located therein for moving its contents to a position of at least partial extraction, and a comparatively frail paper or similar covering located at least partly over the same to shield and hold it to place, substantially as described.

25. In combination with an envelop or similar covering, means located therein for moving its contents to a position of at least partial extraction, and a comparatively frail paper or similar covering located at least partly over the same to shield and hold it to place said covering provided with perforations or punctures over a desired portion of its surface to facilitate its easy rupture when desired, substantially as described.

26. In combination with an envelop or similar covering, means located therein for moving its contents to a position of at least partial extraction, and a comparatively frail paper or similar covering located at least partly over the same to shield and hold it to place, said extraction means pasted or otherwise secured to a desired part of the covering, substantially as described.

27. In combination with an envelop or similar covering, an extractor for moving its contents to a position of at least partial extraction, and a shield or covering over the extractor within the envelop in places partly covering transverse portions of said extractor and in other places wholly covering transverse portions thereof, substantially as described.

28. In combination with an envelop or similar covering, an extractor for moving the contents thereof to a position of at least partial extraction, and a shield or covering for the extractor within the envelop overlapping at least part of its edge nearest the border of the envelop at which the contents are introduced, substantially as described.

29. In combination with an envelop or similar covering, an extractor for moving the contents thereof to a position of at least partial extraction, and a shield or covering within the envelop overlapping at least most of the edge of the extractor nearest the border of the envelop from which contents are introduced, and with parts thereof extending and secured entirely over transverse portions of the extractor, substantially as described.

30. In combination with an envelop or similar covering, an extractor for moving the contents thereof to a position of at least partial extraction, and a shield or covering within the envelop overlapping at least most of the edge of the extractor nearest the border of the envelop from which the contents are introduced, and portions extending and secured entirely over transverse portions of the extractor where it is located within one or both of the folded ends of the envelop, substantially as described.

31. In combination with an envelop or similar covering, an extractor for moving the contents thereof to a position of at least partial extraction, and a shield or covering within the envelop overlapping at least most of the edge of the extractor nearest the border of the envelop at which the contents are introduced, and portions extending and secured entirely over transverse portions of the extractor where it is located within one or both of the folded ends of the envelop, such extended portions provided with perforations or weakening agencies to enable their easy rupture when desired, substantially as described.

32. In combination with an envelop or similar covering, an extractor for moving the contents thereof to a desired position of at least partial extraction, and a shield or covering over all or part of the same provided with perforations or other weakening agencies at least within the zone to be ruptured during operation of the extractor, substantially as described.

33. In combination with an envelop or similar covering, an extractor for moving the contents thereof to a position of at least partial extraction, and a shield or covering for the same within the envelop, the extractor forming a travelable loop or yoke within which the contents of the envelop are introduced, substantially as described.

34. In combination with an envelop or similar covering, an extractor for moving the contents thereof to a position of at least partial extraction, and a shield or covering over all or part of the same provided with perforations or weakening agencies at least within the zone to be ruptured during operation of the extractor, the said extractor forming a travelable loop or yoke within which the contents of the envelop pass, substantially as described.

35. In combination with an envelop or similar covering, means for moving the contents thereof to a position of at least partial extraction carrying lettering or inscriptions and with its initial operating end or portion located in close proximity to a folded border thereof, and a cutter carried by the envelop for opening the same for accessible grasp upon proper opening of the envelop, substantially as described.

36. An envelop or similar covering having a comparatively small opened portion, and means for moving its contents to a position of at least partial extraction, said means having its initial operating or grasping portion located in a position of exposure through such opened portion, means within the envelop for maintaining in place said initial portion, and a cutter carried by said envelop for opening the same, substantially as described.

ORRIN B. PECK.
WILBUR H. PECK.

Witnesses:
THOMAS F. SHERIDAN,
HARRY IRWIN CROMER.